Figure 1:
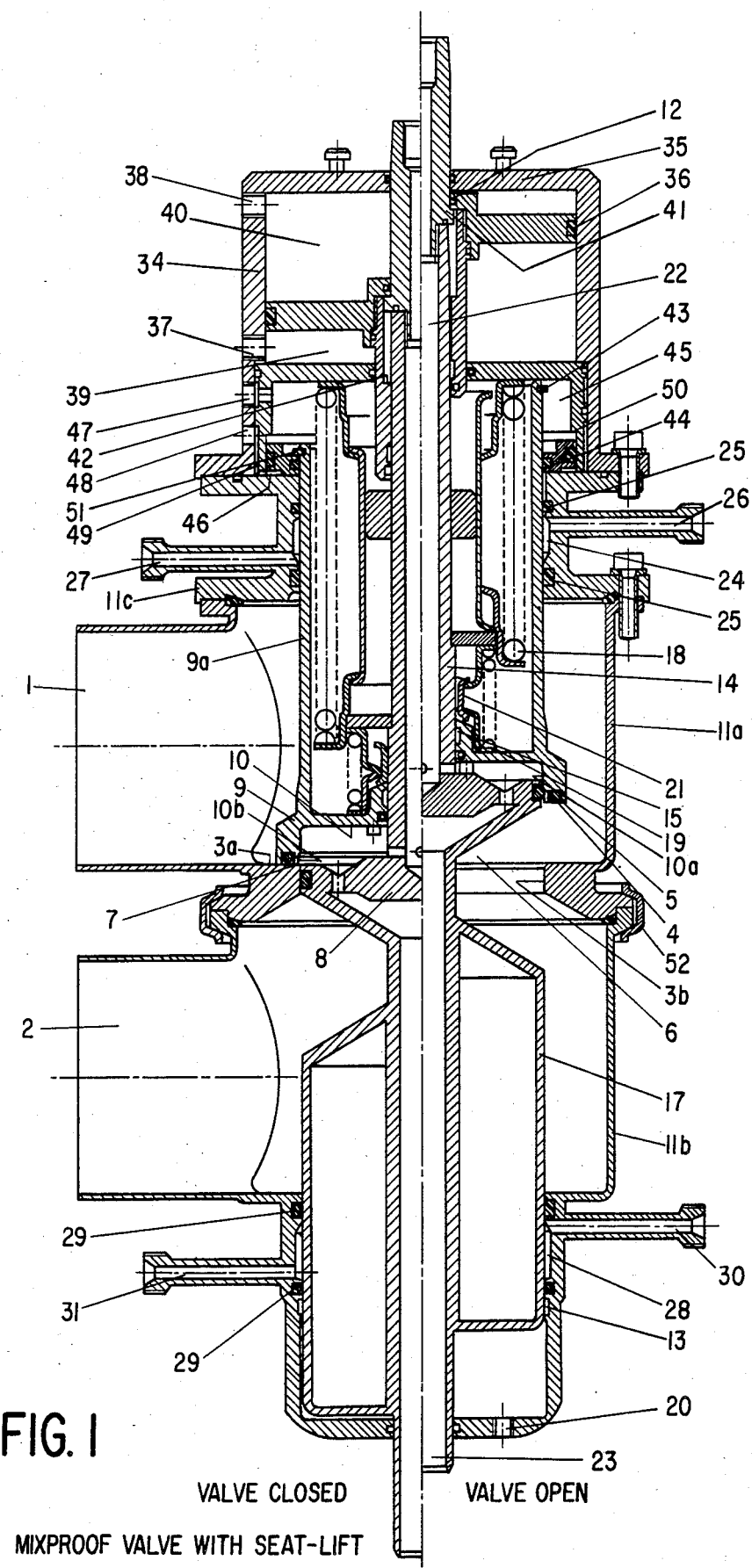

United States Patent [19]

Rasmussen et al.

[11] Patent Number: 4,605,035
[45] Date of Patent: Aug. 12, 1986

[54] DOUBLE SEAT VALVE

[75] Inventors: Erik Rasmussen, Kolding, Denmark; Gunnar Lundquist, Hoerby, Sweden; Stig Lading, Kolding, Denmark

[73] Assignee: Lavrids Knudsen Maskinefabrik A/S, Kolding, Denmark

[21] Appl. No.: 651,700

[22] Filed: Sep. 14, 1984

[51] Int. Cl.⁴ ............... F16K 11/065; F16K 31/122; F16K 11/10; B08B 3/04

[52] U.S. Cl. .................... 137/240; 137/312; 137/614.17; 137/614.18; 137/614.19; 134/166 C

[58] Field of Search .......... 137/238, 240, 312, 614.17, 137/614.18, 614.19, 637.2; 134/166 C

[56] References Cited

U.S. PATENT DOCUMENTS

| | | | |
|---|---|---|---|
| 4,304,251 | 12/1981 | Schädel et al. | 137/614.19 |
| 4,360,039 | 11/1982 | Jeppsson | 137/240 |
| 4,373,545 | 2/1983 | Knappe | 137/614.19 |
| 4,436,106 | 3/1984 | Tuchenhagen et al. | 137/240 |
| 4,460,014 | 7/1984 | Mases et al. | 137/614.19 |

FOREIGN PATENT DOCUMENTS

| | | | |
|---|---|---|---|
| 8402169 | 6/1984 | Denmark | 137/240 |
| 2456675 | 6/1976 | Fed. Rep. of Germany | |
| 2751734 | 6/1979 | Fed. Rep. of Germany | |
| 3005329 | 8/1981 | Fed. Rep. of Germany | |
| 3108778 | 6/1982 | Fed. Rep. of Germany | |
| 0039319 | 4/1985 | Sweden | |

Primary Examiner—G. L. Walton
Attorney, Agent, or Firm—Michael J. Striker

[57] ABSTRACT

A double seat valve includes a valve housing and two valve closure members movable in the housing co-axially and relative to each other between an open and closed position. A leakage space defined between the closure members by a drain outlet. One of the closure members is a slide piston having an end portion sealingly received in a recess provided in the other closure member. The wall of the recess has an annular groove which permits a seal cleaning flow of liquid between the surfaces of the seal provided on one of the closure members and the annular groove into the leakage space.

11 Claims, 10 Drawing Figures

VALVE CLOSED   VALVE OPEN

MIXPROOF VALVE WITH SEAT-LIFT

MIXPROOF VALVE WITH SEAT-LIFT

DOUBLE SEAT VALVE

The invention relates to a double seat valve of the type defined in the preamble of claim 1.

Double-seat valves of this type are known from the European Patent Application No. 81 850 063.9. Although these valves have proven in practice to be in general highly satisfactory, in certain processes in the brewery and dairy industry there are still desired improved possibilities for a simple and reliable cleaning of the valve also with respect to the valve seats and the sealing means.

From German Pat. No. 24 56 675 there is known a similar double-seat valve in which the second closure member can be moved be separate drive means independently from the first closure member into a position in which between both closure members and/or the respective valve seats there is formed a slit not exceeding in cross section that of a drain tube connecting the leakage space to the atmosphere. This known construction, however, does not permit an adequate cleaning of the valve seat and the corresponding sealing sealing surface of the first closure member.

From DE-OS Nos. 27 51 734 and 30 05 329 there are further known other similar double-seat valves having two valve discs each movable between a closed position axially sealing against a conical valve seat, and an open position axially lifted off the respective valve seat. With these constructions the smaller valve disc can be moved by the drive means into abutment with the larger second valve disc and thereafter both valve discs are moved together into the open position. In addition there are provided separate drive means for individually slightly lifting off each individual valve disc in order to enable a flow of cleaning liquid from the adjacent conduit past the valve seat to the leakage space. These known valves, however, are sensitive to pressure differences and pressure hammers in the conduits causing undesired opening movements of the valve discs. In addition, they do not permit any cleaning of the valve seats as long as the adjacent conduits are filled with product.

Finally, DE-A No. 31 08 778 discloses a method for the simultaneous cleaning of both valve seats of a double seat valve being in contact with product on at least one side. To this purpose it is proposed to move a slide-type closure member in contact with product by a predetermined distance towards the product-containing part of the valve housing and simultaneously retract or lift off the other closure member in order to simultaneously expose both valve seats to cleaning liquid.

Accordingly, it is now an object of the invention to provide a double-seat valve of the type defined in the preamble of claim 1, which with minimum product losses during valve operation enables an easy cleaning of both the valve seats and the sealing means of each closure member and can be made to reliably prevent leakage caused by pressure hammers.

In order to solve this object, the double-seat valve defined in the preamble of claim 1 is provided with the features of the characterizing part of claim 1.

Advantageous further modifications of the double-seat valve are defined in the subclaims.

Preferred embodiments of the invention are now described with reference to the enclosed drawings. There are shown in FIG. 1 a schematic longitudinal section of a doubleseat valve in the closed position (left part of the drawing) and the open position (right part of the drawing), FIG. 2 a schematic longitudinal section through the double-seat valve shown in FIG. 1 in the intermediate position of the first closure member (right part of the drawing) and the intermediate position of the second closure member (left part of the drawing), FIG. 3a a schematic partial section through a modified double-seat valve in the closed position, FIG. 3b a schematic partial section through the double-seat valve shown in FIG. 3a in the intermediate position of the first closure member, FIG. 3c a schematic partial section through the double-seat valve shown in FIGS. 3a and 3b in the intermediate position of the second closure member, FIG. 3d a schematic partial section through the double-seat valve shown in FIGS. 3a to 3c in the open position, FIG. 4a a schematic partial section through a modified double-seat valve in the closed position, FIG. 4b a schematic partial section through the double-seat valve shown in FIG. 4a in the intermediate position of the first closure member, FIG. 4c a schematic partial section through the double-seat valve shown in FIGS. 4a and 4b in the intermediate position of the second closure member, FIG. 4d a schematic partial section through the doubleseat valve shown in FIGS. 4a to 4c in the open position.

Figure 2:
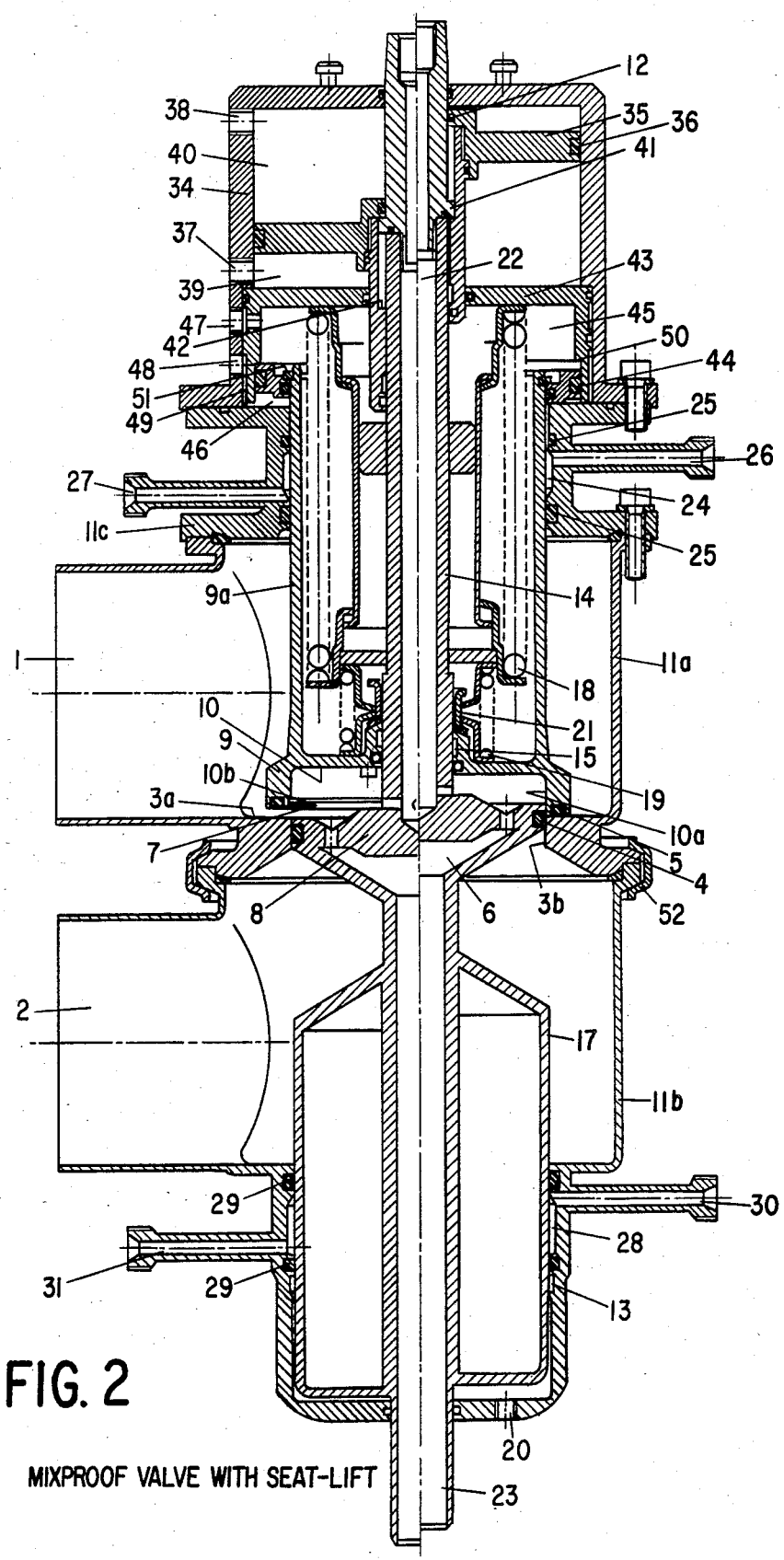

The double seat valve shown in FIGS. 1 and 2 comprises a valve housing 11 consisting of an upper housing member 11a having a conduit opening 1, a lower housing member 11b having a conduit opening 2, and a cover member 11c. The conduit openings 1 and 2 are adapted for connection to conduits (not shown) which in operation are used for delivering fluid or a cleaning liquid, respectively. The upper housing member 11a and the lower housing member 11b being releasibly connected by a clamping member 52, communicate through a valve opening forming an axial valve seat 3a and a cylindrical valve seat 3b. In the valve housing 11 there are coaxially guided a first closure member forming a slide piston 8 and a second closure member 9 between an open position and a closed position. The first and second valve members together realize in their closed positions a double seal between the space within the upper housing member 11a and the space within the lower housing member 11b. To this purpose the slide piston 8 is provided with a radial sealing ring 4 adapted to be in the closed position in sealing contact with the cylindrical valve seat 3b. The second closure member 9 has an axial sealing ring 5 adapted to sealingly abut in the closed position with the axial valve seat 3a of the upper housing member 11a. The second closure member 9 has a cylindrical piston wall 9a sealingly guided for axial displacement in an opening of the cover member 11c.

The slide piston 8 is rigidly connected to a coaxial rod 14 and a drive piston 17 having substantially the same outer diameter than the cylindrical valve seat 3b and being guided for axial displacement in a slide ring 13 in the lower housing member 11b. The rod 14 is guided for axial displacement in a slide ring 12 disposed in a central opening of an auxiliary cylinder 34 rigidly mounted on an upper flange of the cover member 11c. Thus, the slide piston 8, the drive piston 17 and the rod 14 form a rigid unit slidably guided near both ends thereof.

Between the slide piston 8 and the second closure member 9 there is formed a lakeage space 7 in both the closed and the open positions thereof. Said leakage space 7 is permanently connected to the outside by a drain channel 6 extending coaxially through the drive cylinder 17 and an opening in the lower wall of the lower housing member 11b. Thus, any possible leakage past the radial sealing ring 4 or the axial sealing ring 5, respectively is drained from the leakage space 7 through the drain channel 6 so that any intermixing of the products in the conduits connected to conduit openings 1 and 2 will be prevented.

In the rod 14 there is provided an axial inlet channel 22 communicating via radial bores with the leakage space 7. By introducing a cleaning fluid through inlet channel 22 it is possible to clean the leakage space 7 and the drain channel 6 in both the open and the closed positions of the first and second closure members 8 and 9. The rod 14 is additionally guided in a slide ring 15 in the annular second closure member 9.

In the internal space surrounded by the cylindrical piston wall 9a of the second closure member 9 there are arranged a first compression spring 18 and a second compression spring 19. The first compression spring 18 is supported at its end remote from the valve seats against an auxiliary drive cylinder 43 rigidly mounted within the auxiliary cylinder 34 for purposes to be described later. The first compression spring 18 permanently urges the second closure member 9 into its closed position. The weaker second compression spring 19 permanently acts against the second closure member 9 in order to hold together the lower and upper closure members 8 and 9.

The prime mover for opening the valve is a pneumatic motor comprising a gas chamber 32 formed between the drive piston 17 and the bottom wall of the lower housing member 11b. In order to move the valve into its open position, compressed gas is introduced into the gas chamber 32 via the inlet opening 20. Since the gas pressure will be greater than the strength of the first compression spring 18, the slide piston 8 and the rod 14 both rigidly connected to the drive piston 17 begin to move upwardly against the force of the first compression spring 18. The second closure member 9 is provided at its end facing the slide piston 8 with a recess 10 having a substantially cylindrical seat wall 10a coaxial to the cylindrical valve seat 3b and dimensioned to receive during opening movement the end portion of the slide piston 8 before the second closure member 9 opens. When the opening movement continues, the slide piston comes into contact with an abutment disposed in the recess 10 of the second closure member. Thereafter the gas pressure in the gas chamber 32 moves both closure members 8 and 9 together into their opening position shown in the right-hand half of FIG. 1.

When the gas pressure in the gas chamber 32 ceases, the first compression spring 18 forces the two united closure members 8 and 9 downwardly until the axial sealing ring 5 of the second closure member 9 sealingly rests against the axial valve seat 3a so that the second closure member 9 comes to a rest in its closed position, whereas the slide piston 8 continues to be moved downward by the first compression spring 18 until there is reached the fully closed position shown in the left-hand half of FIG. 1.

In order to enable an adequate cleaning of those parts of the cylindrical piston wall 9a and the circumferential surface of the drive piston 17 which during opening movement are displaced into sliding contact with the respective housing member, there are provided in the upper housing member 11a a washing space 24 between sealing rings 25, said washing space 24 having an inlet channel 26 and an outlet channel 27 for a cleaning fluid.

Likewise, the lower housing member 11b is provided with a washing space 28 disposed between sealing rings 29 and having an inlet channel 30 and an outlet channel 31 for cleaning fluid.

In order to enable an adequate cleaning not only of the leakage space 7, tub also of the sealing surfaces of the sealing rings 4 and 5 and the respective valve seats 3a and 3b, there is provided an annular groove 10b disposed at the entrance end of the cylindrical seat wall 10a of the recess 10. the adjacent edge of the cylindrical valve seat 3b is slightly beveled and forms in the closed position of the second closure member 9 a sidewall for said annular groove 10b which is dimensioned to permit in an intermediate position of the radial sealing ring 4 opposite said annular groove 10b a flow of cleaning liquid along the cylindrical valve seat 3b and between the opposed circumferencial surfaces of the sealing ring 4 and the annular groove 10b.

In order to move the slide piston 8 to its intermediate position there are provided auxiliary drive means idependent from the pneumatic motor adapted to move the drive piston 17. In the auxiliary cylinder 34 there is disposed an auxiliary piston 35 having a radial sealing ring 36 being in permanent sealing contact with the internal circumferential surface of the auxiliary cylinder 34. The auxiliary piston 35 separates an upper gas chamber 40 having an inlet opening 38 from a lower gas chamber 39 having an inlet opening 37. The annular auxiliary piston 33 is sealingly guided for limited axial movement on the rod 14 which has an external projection 41 cooperating with an internal shoulder 42 of the auxiliary piston 35 for limiting the axial movement thereof. In order to move the slide piston 8 with its radial sealing ring 4 into the intermediate position there is introduced a pressuriced gas via inlet opening 37 into the lower gas chamber 39 to cause the auxiliary piston 33 to move upwardly from the position shown in the left-hand half of FIG. 2 to the position shown in the right-hand half of the same figure. Since the internal shoulder 42 of the auxiliary piston 35 abuts the external projection 41 of the rod 14 at a position few millimeters before the auxiliary piston 35 abuts the upper wall of the auxiliary cylinder 34, there is obtained a lifting movement of the slide piston 8 by some millimetres into the intermediate position os the radial sealing ring 4. When the gas pressure in the lower gas chamber 39 ceases, the first compression spring 18 moves the slide piston 8 back into its closed position.

In order to also clean the axial valve seat 3a and the corresponding axial sealing ring 5 there is further provided a second annular auxiliary piston 44 guided for limited axial movement in the auxiliary drive cylinder 43. The annular auxiliary piston 44 separates a lower gas chamber 46 connected via an annular channel 49 with an inlet opening 48 from an upper gas chamber 45 having an inlet opening 47. The internal circumferential wall of the auxiliary drive cylinder 43 is provided with an abutment 50 for limiting the upward movement of the second auxiliary piston 44 which in addition cooperates at its inner margin with a projection 51 at the upper end of the cylindrical piston wall 9a of the second closure member 9. In the embodiment shown this projection is a circlip 31 engaged in an annular groove of the cylindrical piston wall 9a.

When pressurized gas is introduced via the inlet opening 48 and the annular channel 49 into the lower gas chamber 46 this causes an upward displacement of the second auxiliary piston 44 by a small distance of about 3 mm until the second auxiliary piston 44 comes into contact with the abutment 30 of the auxiliary drive cylinder 43. This movement due to the engagement of the second auxiliary piston 44 with the circlip 31 fixed to the cylindrical piston wall 9a causes a lifting movement of the second closure member 9 by a small distance of about 3 mm into an intermediate position enabling a flow of cleaning liquid from the internal space of the upper housing member 11a between the axial valve seat 3a and the opposed surface of the axial sealing ring 3 into the leakage space 7.

If during the movement of the slide piston 8 into its intermediate position it is desired to double-secure the second closure member in its closed position, there can be introduced pressurized gas through inlet opening 47 into the gas chamber 43 which includes the whole internal space of the second closure member 9 so that the latter is urged into its closed position by the first compression spring 18 and the additional gas pressure int he gas chamber 45. During the movement of the second closure member 9 into its intermediate position shown in the left-hand half of FIG. 2, there can be introduced pressurized gas through inlet opening 38 into the upper gas chamber 40 so that the auxiliary piston 35 permanently urges against the external projection 41 of the rod 14.

Figure 3A:
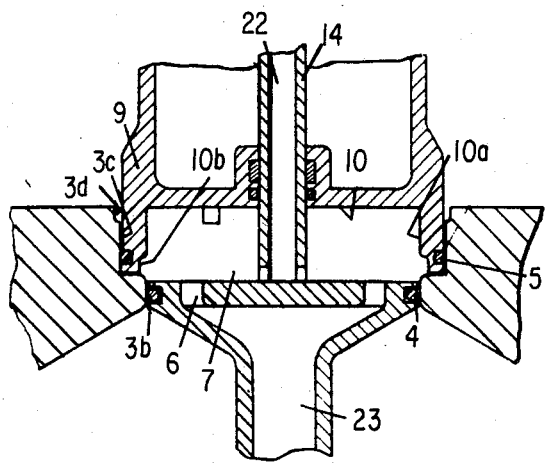
Figure 3B:
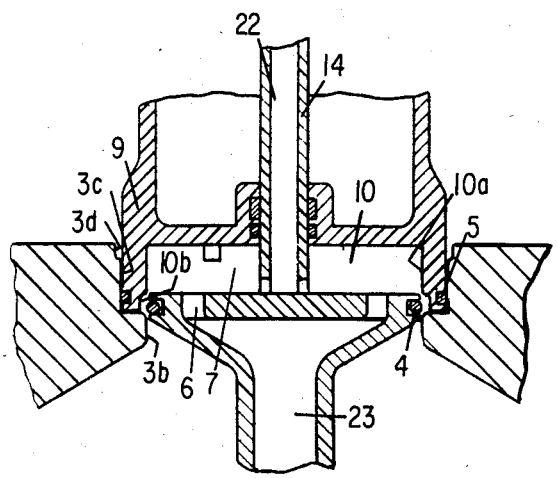
Figure 3C:
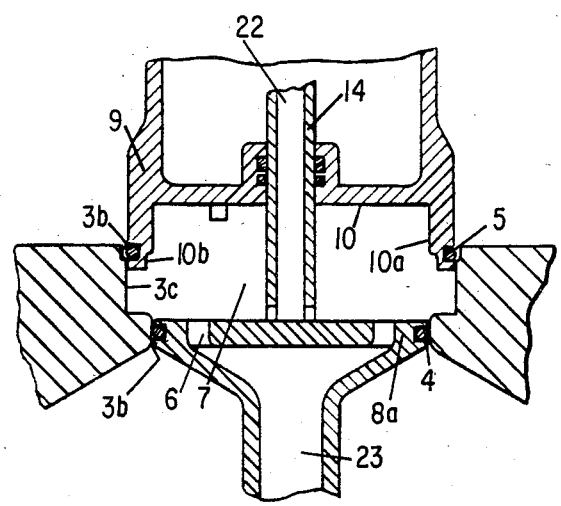
Figure 3D:
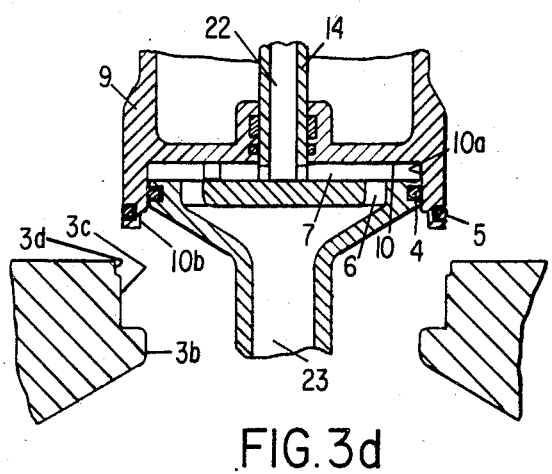

The double seat valve shown in FIGS. 3a to 3d is closely similar in construction and operation to the valve shown in FIGS. 1 and 2, except that the second closure member 9 also has a radial sealing ring 3a which in the closed position is in sealing contact with a second cylindrical valve seat 3c having a diameter slightly larger than the first cylindrical valve seat 3b. In addition to the annular groove 10b provided at the entrance end of the cylindrical seat wall 10a of the recess 10, there is provided a second annular groove 3d in the second cylindrical valve seat 3c at a predetermined distance above the area which in the closed position is in contact with the radial sealing ring 3a. FIG. 3a shows the modified double-seat valve in its closed position, whereas the intermediate position of the slide piston 8 is shown in FIG. 3b, the intermediate position of the second closure member 9 is shown in FIG. 3c and the open position of the valve is shown in FIG. 3d. The movement of the closure members between their closed position and their open position, the movement of the slide piston between its closed position and the intermediate position, and the movement of the second closure member between its closed position and its intermediate position are effected in the same way explained in connection with FIGS. 1 and 2 by moving the drive piston 17 or the auxiliary piston 35 or the second auxiliary piston 44 by means of pressurized gas.

Figure 4A:
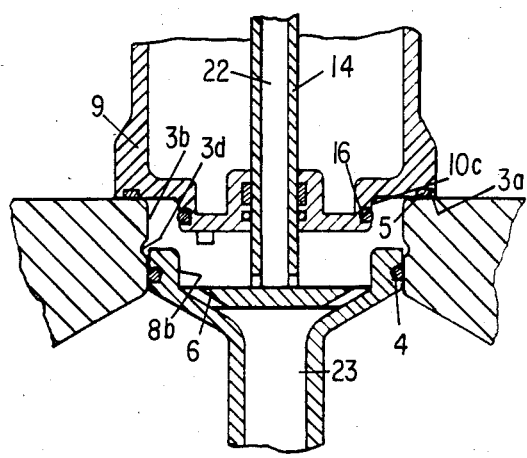
Figure 4B:
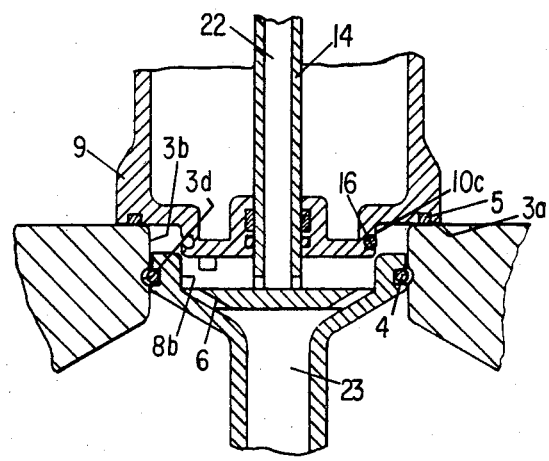
Figure 4C:
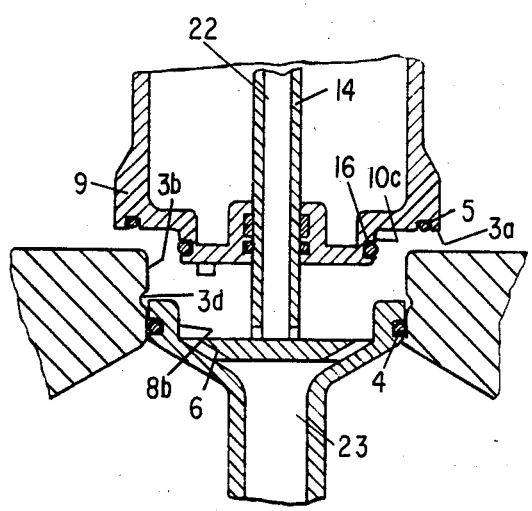
Figure 4D:
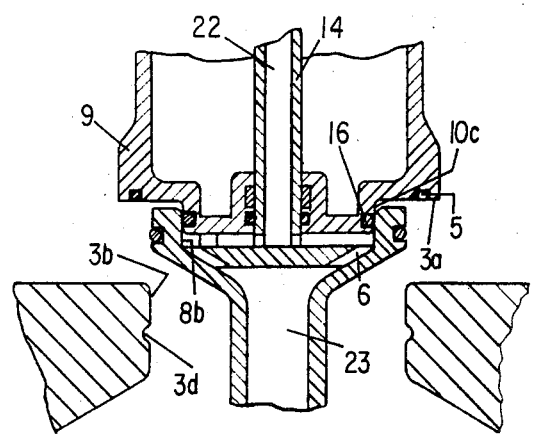

The double-seat valve shown in FIGS. 4a to 4d is also closely similar in construction and operation to the valve shown in and described in connection with FIGS. 1 and 2, except that said slide piston 8 comprises at its end facing the second closure member 9 an axially protruding outer annular rim 8a having a substantially cylindrical inner wall 8b, whereas the second closure member 9 is provided with an annular recess 10 having a cylindrical inner wall 10c dimensioned to receive during opening movement the annular rim 8a of the slide piston 8. In addition on one of said inner walls 8b or 10c there is provided a radial sealing ring 16 for sealing during opening movement against the opposed inner wall 10c or 8b, respectively, shortly before the second valve member 9 is lifted off its axial valve seat 3a. In this case, the annular groove 3d is disposed in the cylindrical valve seat 3b in order to enable in the position of the radial sealing ring 4 opposite said annular groove 3d a flow of cleaning liquid along the cylindrical valve seat 3b and between the radial sealing ring 4 and the opposed surfaces of the annular groove 3d into the leakage space 7. The movement of the clousre members between the closed and open positions or the closed and intermediate positions, respectively are effected in the same way as described in connection with FIGS. 1 and 2. FIG. 4a shows the modified double-seat valve in its closed position, whereas FIG. 4b shows the valve in the intermediate position of the slide piston 8, 4c shows the intermediate position of the second closure member 9, and FIG. 4b the valve in the open position.

The double-seat valve according to the invention have been described above with reference to preferred embodiments.

It is possible to further modify the double-seat valve in accordance with the requirements of the practice without leaving the principle of the invention.

We claim:

1. A double seat valve comprising: a valve housing having at least two conduit openings for fluid inlet and outlet, two coaxial valve seats disposed between said openings, two valve closure members each guided in said valve housing for coaxial movement relative to each other and to their respective valve seats betwen an open position and a closed position, realizing together in their closed position a double seal between said openings, a first closure member being adapted to abut during its opening movement against a second closure member and to move the latter the open position, a leakage space defined between said closure members in both the closed and the open position thereof, a drain outlet permanently connecting said leakage space to the outside of the valve, and drive means for moving said first and second closure members between said closed and said open positions, respectively, at least one closure member being a slide piston having radial sealing means and being operative to slide between an open position and a closed position sealingly received in a cylindrical valve seat and the other closure member being provided at its end facing said slide piston with a recess having a substantially cylindrical seat wall coaxial to said cylindrical valve seat and dimentsioned to sealingly receive during opening movement an end portion of said slide piston before said second closure member opens, at least one of said cylindrical valve seat and the cylindrical seat wall of said recess being provided with a circumferential annular groove at a position passed by the radial sealing means of said slide piston during its movement between the closed position and the position in which both closure members abut for common movement, said annular groove being dimensioned to permit in a predetermined intermediate position of said radial sealing means opposite said annular groove, in which said first closure is partially received within said second closure member, a seat-cleaning flow of liquid flows along said cylindrical valve seat and between the opposed circumferential surfaces of said radial sealing means and said annular groove into said leakage space, and wherein separate auxiliary drive means are provided for moving said first closure member between its closed position and said intermediate position.

2. A valve according to claim 1, wherein the recess of the second closure member has a cylindrical seat wall substantially flush with said cylindrical valve seat, a radial sealing ring is disposed at the end portion of the slide piston and is shifted during the opening movement from said valve seat into sealing contact with said aligned cylindrical seat wall, and the annular groove is disposed at the entrance of said cylindrical seat wall so that in the closed position of the second closure member an adjacent edge of said cylindrical valve seat forms a side wall for said annular groove.

3. A valve according to claim 1, wherein said second closure member has radial sealing means operative for movement between an open position and a closed position sealingly received in a second cylindrical valve seat having a diameter larger than that of the cylindrical valve seat of the first closure member, said second cylindrical valve seat being provided with a circumferential annular groove at a position passed by the radial sealing means of said second closure member during its movement between its closed position and its open position, said annular groove being dimensioned to permit in an intermediate position of said second radial sealing means opposite said annular groove a seat-cleaning flow of liquid along said second cylindrical valve seat and between the opposed circumferential surfaces of the respective radial sealing means and said annular groove into said leakage space, and wherein separate auxiliary drive means are provided for moving said second closure member independently from said first closure member between its closed position and the respective intermediate position.

4. A valve according to claim 1, wherein said slide piston comprises at its end facing the second closure member an axially protruding outer annular rim having a substantially cylindrical inner wall, said second closure member being provided with an annular recess having a substantially cylindrical inner wall and being dimensioned to receive during opening movement said annular rim of said slide piston, one of said inner walls being provided with a radial sealing ring adapted to seal during opening movement against the opposed inner wall shortly before said second valve member opens, said annular groove disposed in said cylindrical valve seat permitting in said intermediate position a seat-cleaning flow of liquid to and from said leakage space.

5. A valve according to claim 1, wherein said second closure member is shaped as a substantially cylindrical piston having a cylindrical piston wall sealingly guided in said valve housing and having a diameter equal to or slightly smaller than that of the sealing means, said slide piston being provided with a rod sealingly extending axially through said second closure member, and wherein first spring means are provided in an internal space of said second closure member, said first spring means permanently acting on said rod for urging said slide piston into its closed position, and wherein second spring means are provided, urging said second closure member during the opening of the valve towards said slide piston, the internal space surrounded by the cylindrical piston wall of the second closure member together with the internal space of a stationary cylinder secured to the housing forming a gas chamber for receiving a pressurized gas through an inlet opening in order to urge the second closure member into its closed position.

6. A valve according to claim 5, wherein an annular auxiliary piston is sealingly guided for limited axial movement in said stationary cylinder, said annular auxiliary piston in addition being sealingly guided with its inner circumference on the outer circumferential surface of the piston wall of the second closure member, said annular auxiliary piston separating chambers for receiving pressurized gas via respective inlet openings and having a surface turned away from that slide piston and adapted to cooperate with a projection protruding radially outwardly from the cylindrical piston wall in order to move the second closure member between its closed position and said intermediate position.

7. A valve according to claim 5, wherein the slide piston is provided with an axial drain tube sealingly guided in a bottom part of the valve housing and permanently communicating with the leakage space, said axial rod being provided with an internal axial inlet channel for introducing a cleaning liquid into the leakage space, and wherein means are provided for closing or reducing a flow cross section of the drain tube in order to permit in the intermediate position of one of the slide pistons and the second closure member, respectively, a seat-cleaning flow of liquid from the inlet channel through the leakage space and between the opposed circumferential surfaces of the respective sealing means and the opposed seat wall into the respective part of the valve housing.

8. A valve according to claim 1, wherein the side walls of said annular groove have rounded or bevelled edges to provide a smooth transition for the radial sealing means.

9. A valve according to claim 1, wherein said slide piston is connected with a drive piston of said drive means forming a movable part of a pneumatic motor adapted to move said slide piston into abutment with said second closure member and thereafter moving both closure members into their open position, said drive piston being sealingly guided in said valve housing and having substantially the same diameter as that of the cylindrical valve seat of said slide piston, and wherein an auxiliary piston is guided on a rod of the slide piston for limited axial movement, said auxiliary piston being displacable in an auxiliary cylinder so as to separate same into two chambers for receiving a pressurized gas through respective inlet openings in order to move said slide piston between its closed position and its intermediate position.

10. A double seat valve comprising: a valve housing having at least two conduit openings for fluid inlet and outlet, two coaxial valve seats disposed between said openings, two valve closure members each guided in said valve housing for coaxial movement relative to each other and to their respective valve seats between an open position and a closed position, realizing together in their closed position a double seal between said openings, a first closure member being adapted to abut during its opening movement against a second closure member and to move the latter the open position, a leakage space defined between said closure members in both the closed and the open position thereof, a drain outlet permanently connecting said leakage space to the outside of the valve, and drive means for moving said first and second closure members between said closed and said open positions, respectively, at least one closure member being a slide piston having radial sealing means and being operative to slide between an open position and a closed position sealingly received in a cylindrical valve seat and the other closure member being provided at its end facing said slide piston with a recess having a substantially cylindrical seat wall coaxial to said cylindrical valve seat and dimensioned to sealingly receive during opening movement an end portion of said slide piston before said second closure member opens, at least one of said cylindrical valve seat and the cylindrical seat wall of said recess being provided with a circumferential annular groove at a position passed by the radial sealing means of said slide piston during its movement between the closed position and the position in which both closure members abut for common movement, said annular groove being dimensioned to permit in a predetermined intermediate position of said radial sealing means opposite said annular groove, in which said first closure is partially received within said second closure member, a seat-cleaning flow of liquid flows along said cylindrical valve seat and between the opposed circumferential surfaces of said radial sealing means and said annular groove into said leakage space, and wherein separate auxiliary drive means are provided for moving said first closure member berween its closed position and said intermediate position, the recess of the second closure member having a cylindrical seat wall substantially flush with said cylindrical valve seat, a radial sealing ring being disposed at the end portion of the slide piston and being shifted during the opening movement from said valve seat into sealing contact with said aligned cylindrical seat wall, and the annular groove being disposed at the entrance of said cylindrical seat wall so that in the closed position of the second closure member an adjacent edge of said cylindrical valve seat forms a side wall for said annular groove.

11. A double seat valve comprising: a valve housing having at least two conduit openings for fluid inlet and outlet, two coaxial valve seats disposed between said openings, two valve closure members each guided in said valve housing for coaxial movement relative to each other and to their respective valve seats between an open position and a closed position, realizing together in their closed position a double seal between said openings, a first closure member being adapted to abut during its opening movement against a second closure member and to move the latter the open position, a leakage space defined between said closure members in both the closed and the open position thereof, a drain outlet permanently connecting said leakage space to the outside of the valve, and drive means for moving said first and second closure members between said closed and said open positions, respectively, at least one closure member being a slide piston having radial sealing means and being operative to slide between an open position and a closed position sealingly received in a cylindrical valve seat and the other closure member being provided at its end facing said slide piston with a recess having a substantially cylindrical seat wall coaxial to said cylindrical valve seat and dimensioned to sealingly receive during opening movement an end portion of said slide piston before said second closure member opens, at least one of said cylindrical valve seat and the cylindrical seat wall of said recess being provided with a circumferential annular groove at a position passed by the radial sealing means of said slide piston during its movement between the closed position and the position in which both closure members abut for common movement, said annular groove being dimensioned to permit in a predetermined intermediate position of said radial sealing means opposite said annular groove, in which said first closure is partially received within said second closure member a seat-cleaning flow of liquid flows along said cylindrical valve seat and between the opposed circumferential surfaces of said radial sealing means and said annular groove into said leakage space, and wherein separate auxiliary drive means are provided for moving said first closure member between its closed position and said intermediate position, said second closure member having radial sealing means operative for movement between an open position and a closed position sealingly received in a second cylindrical valve seat having a diameter larger than that of the cylindrical valve seat of the first closure member, said second cylindrical valve seat being provided with a circumferential annular groove at a position passed by the radial sealing means of said second closure member during its movement between its closed position and its open position, said annular groove being dimensioned to permit in an intermediate position of said second radial sealing means opposite said annular groove a seat-cleaning flow of liquid along said second cylindrical valve seat and between the opposed circumferential surfaces of the respective radial sealing means and said annular groove into said leakage space, and wherein separate auxiliary drive means are provided for moving said second closure member independently from said first closure member between its closed position and a respective intermediate position.

* * * * *